United States Patent
Baentsch et al.

(10) Patent No.: US 8,214,642 B2
(45) Date of Patent: Jul. 3, 2012

(54) SYSTEM AND METHOD FOR DISTRIBUTION OF CREDENTIALS

(75) Inventors: Michael Baentsch, Gross (CH); Peter Buhler, Horgen (CH); Thomas Eirich, Waedenswil (CH); Thorsten Kramp, Kilchberg (CH); Thomas Weigold, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 936 days.

(21) Appl. No.: 12/062,888

(22) Filed: Apr. 4, 2008

(65) Prior Publication Data

US 2008/0250244 A1    Oct. 9, 2008

(30) Foreign Application Priority Data

Apr. 5, 2007  (EP) .................................... 07105710

(51) Int. Cl.
*H04L 9/32* (2006.01)
(52) U.S. Cl. ........ 713/168; 713/172; 713/182; 713/184; 713/186; 726/21
(58) Field of Classification Search .................. 713/168, 713/172, 182, 184, 186; 726/21
See application file for complete search history.

(56) References Cited

U.S. PATENT DOCUMENTS

| | | | |
|---|---|---|---|
| 6,674,908 B1 * | 1/2004 | Aronov | 382/232 |
| 6,760,841 B1 * | 7/2004 | Fernandez | 713/172 |
| 6,819,766 B1 * | 11/2004 | Weidong | 380/277 |
| 7,265,692 B2 * | 9/2007 | Martin et al. | 341/107 |
| 2003/0159031 A1 * | 8/2003 | Muller et al. | 713/155 |
| 2004/0049685 A1 * | 3/2004 | Jaloveczki | 713/182 |
| 2005/0021845 A1 * | 1/2005 | Yasui et al. | 709/238 |
| 2005/0219610 A1 * | 10/2005 | Kimura et al. | 358/1.15 |
| 2005/0278528 A1 * | 12/2005 | Kathan | 713/168 |
| 2006/0047735 A1 * | 3/2006 | Nunes | 708/250 |
| 2006/0168657 A1 * | 7/2006 | Baentsch et al. | 726/21 |
| 2006/0282681 A1 * | 12/2006 | Scheidt et al. | 713/186 |
| 2007/0300076 A1 * | 12/2007 | Diffie et al. | 713/184 |
| 2008/0022085 A1 * | 1/2008 | Hiltgen | 713/155 |
| 2008/0059590 A1 * | 3/2008 | Sarafijanovic et al. | 709/206 |
| 2008/0123852 A1 * | 5/2008 | Jiang | 380/273 |
| 2008/0201576 A1 * | 8/2008 | Kitagawa et al. | 713/168 |

FOREIGN PATENT DOCUMENTS

EP           1024626            8/2000

(Continued)

*Primary Examiner* — Ashok Patel
*Assistant Examiner* — Gary Garcia
(74) *Attorney, Agent, or Firm* — Vazken Alexanian

(57) ABSTRACT

The invention relates to a method for distribution of a set of credentials from a credential issuer to a credential user. The credential user is provided with a user device. A first channel and a second channel are provided for communication between the user device and the credential issuer. A shared key is distributed between the user device and the credential issuer by means of the second channel. A binary representation of the set of credentials with a predefined maximum level of deviation from a uniform distribution is generated. The binary representation of the set of credentials is encrypted by means of the shared key. The encrypted set of credentials is distributed via the first channel from the credential issuer to the user device. The encrypted set of credentials is decrypted by the user device by means of the shared key.

22 Claims, 9 Drawing Sheets

FOREIGN PATENT DOCUMENTS

| | | |
|---|---|---|
| EP | 1 176 844 | 1/2002 |
| EP | 1559256 B1 | 8/2006 |
| EP | 1708405 | 10/2006 |
| WO | WO98/37524 | 8/1998 |
| WO | WO99/16029 | 4/1999 |
| WO | WO00/49585 | 8/2000 |
| WO | WO01/09851 | 2/2001 |
| WO | WO01/93528 | 12/2001 |
| WO | WO02/21464 | 3/2002 |
| WO | WO2004/043037 | 5/2004 |

* cited by examiner

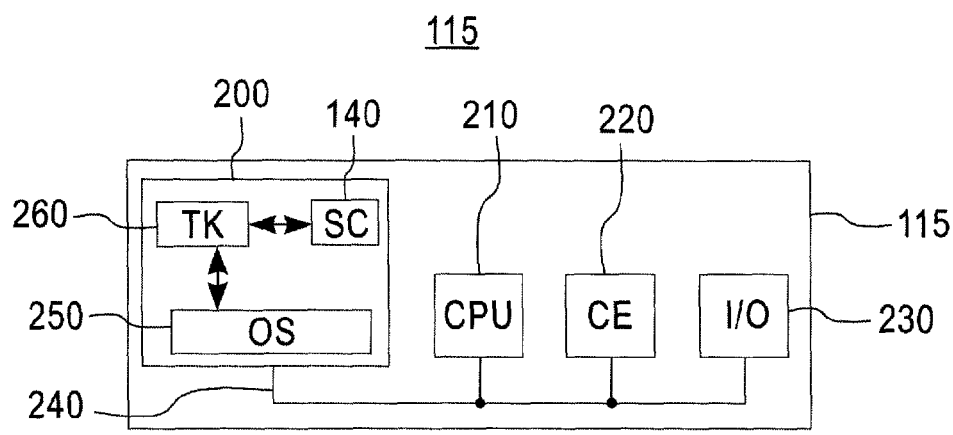
FIG. 2
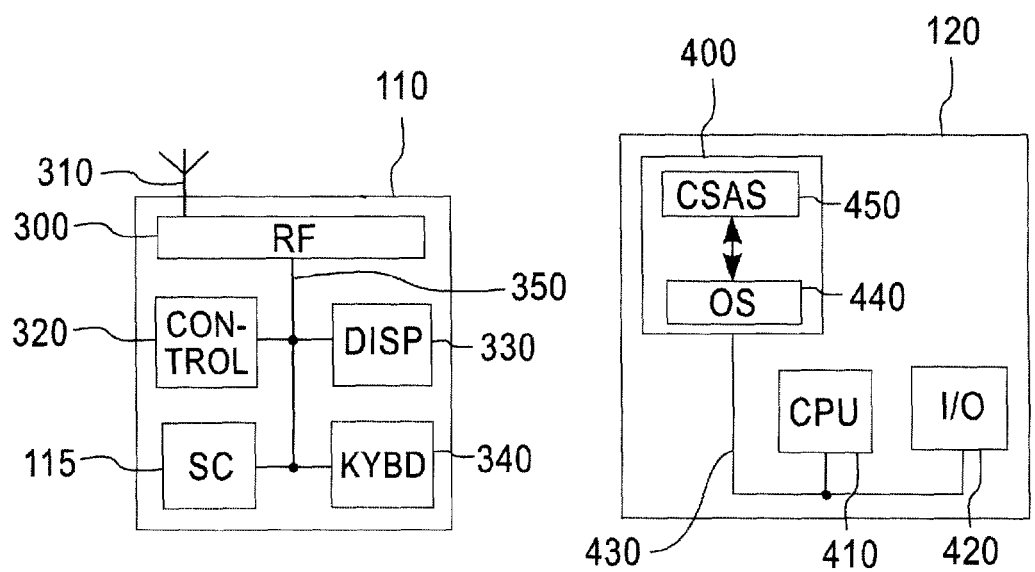
FIG. 3   FIG. 4

SYSTEM AND METHOD FOR DISTRIBUTION OF CREDENTIALS

CROSS-REFERENCE TO RELATED APPLICATIONS

This application claims priority under 35 U.S.C. 119 from European Patent Application No. 07105710 filed Apr. 5, 2007, the entire contents of which are incorporated herein by reference.

BACKGROUND OF THE INVENTION

1. Field of the Invention

The present invention is related to methods for distribution of one or more credentials from a credential issuer to a credential user. The invention is further related to a corresponding system, a corresponding server, a corresponding user device and corresponding computer programs.

2. Description of the Related Art

The credentials can be for example One Time Authentication Codes (OTACs) such as Transaction Numbers (TANs). Furthermore, credentials can be for example Personal Identification Numbers (PINs), passwords, activation codes or strong key material. One time authentication codes with paper based scratch lists of transaction authentication numbers are popular in the field of online transactions. Paper based scratch lists are both relatively insecure and inconvenient to access. Typically, a scratch list is sent from a service provider such as a bank to a customer via plain mail. A mailed scratch list can be intercepted en route to the customer and copied. In addition, many customers cannot be relied upon to store scratch lists in a secure location such as a safe. This is especially the case where the scratch list is used regularly. A regularly used scratch list may be left in the open, on a desk for example. This provides others with access to the scratch list. If a scratch list is carried by a customer, it may be lost or stolen. OTACs on scratch lists are not usually encrypted. Customer account numbers, which are generally combined with an OTAC to effect a transaction, are widely regarded as being publicly known. It is inconvenient for many customers to manually keep track of which OTACs have been used. When moving from one scratch list to another, customers need to temporarily store or carry two scratch lists. This enhances security risk. Furthermore, paper based scratch lists are complicated for the issuing service providers to print and mail in a timely manner.

WO98/37524 describes a transaction method using a mobile device. This method employs International Debit User Identification (IDUI) numbers to identify individual accounts. The IDUI is analogous to a customer bank account number. Specifically, the IDUI is pre-loaded onto a credit/debit card. During operation, a point of sale (POS) terminal reads the IDUI from a credit/debit card and displays an amount to be deducted from an identified account. The customer completes the transaction by pressing an OK button of the POS terminal. The POS terminal sends a transaction receipt to a server in the bank responsible for the account. WO98/37524 proposes pre-storing the IDUI on a Subscriber Identification Module (SIM) smart card as used in GSM mobile phone networks instead of on a magnetic strip or memory card. The IDUI is then read from the smart card by the terminal in a contact-less manner. Transaction receipts are sent to the server for verification by SMS messages. This scheme discusses only the uses of IDUIs for transactions with POS terminals via a contact-less interface and exchanging SMS messages for transaction verification. The scheme is not suitable for OTAC delivery. This is because IDUIs are fixed for each account. OTACs, however, are not. Similar electronic payment systems are described in EP1 176 844, WO99/16029, WO00/49585, WO01/09851, WO02/21464, and WO01/93528.

EP 1559256 B1 describes a method of providing a user device with a set of access codes. According to this method a strong symmetrical key such as a 16 byte Data Encryption Standard (DES) key is used for the encryption of the access codes.

It is an object of the invention to provide other solutions for distribution of credentials.

It is a further object of the invention to provide solutions for initial distribution of credentials from a credential issuer to a credential user.

It is a further object of the invention to provide solutions for distribution of credentials that are broadly applicable.

It is a further object of the invention to provide solutions for distribution of credentials with improved ease of use.

BRIEF SUMMARY OF THE INVENTION

The present invention is directed to methods, a system, a server, a user device and computer programs as defined in the independent claims. Further embodiments of the invention are provided in the appended dependent claims.

According to a first aspect of the invention there is provided a method for distribution of a set of credentials from a credential issuer to a credential user, wherein the credential user is provided with a user device, wherein a first channel and a second channel are provided for communication between the user device and the credential issuer, the method comprising the steps of:

distributing a shared key between the user device and the credential issuer by means of the second channel, generating a binary representation of the set of credentials with a predefined maximum level of deviation from a uniform distribution, encrypting the binary representation of the set of credentials by means of the shared key, distributing the encrypted set of credentials via the first channel from the credential issuer to the user device, decrypting the encrypted set of credentials by the user device by means of the shared key.

By means of the predefined maximum level of deviation from a uniform distribution, it can be defined how much redundancy the binary representation of the set of credentials may comprise. In other words, by means of the predefined maximum level of deviation from a uniform distribution, it can be defined how much structure the binary representation of the set of credentials may comprise. Furthermore, by means of the predefined maximum level of deviation from a uniform distribution, it can be defined or specified that the binary representation of the set of credentials has a distribution of zeros and ones that is sufficiently close to uniformity for the security requirements of the respective application or system. Setting a predefined maximum level of deviation from a uniform distribution in the binary representation of the set of credentials enhances the security of the distribution of the set of credentials. The binary representation of the set of credentials may have the maximum level of deviation from a uniform distribution, but may also have lower levels of deviation from a uniform distribution. The lower the maximum level of deviation from a uniform distribution, the closer is the binary representation of the set of credentials to a uniform distribution of zeros and ones, the less structure and the less redundancy comprises the set of credentials and the less vulnerable is the set of credentials to brute force key search attacks. In other words, the attacker cannot rely on structural information to determine on his own if the set of credentials has been decrypted correctly by a trial key.

Setting a predefined maximum level of deviation from a uniform distribution defines a security relevant variable that is otherwise unknown or uncertain or undetermined. This allows for setting other security relevant variables of a credential distribution system in dependence on this predefined maximum level of deviation from a uniform distribution. This again allows for more flexible designs of credential distribution systems. Preferably the credential issuer will set, determine or choose the predefined maximum level of deviation from a uniform distribution in dependence on the respective application. Setting a predefined maximum level of deviation from a uniform distribution for the binary representation allows in particular for reducing the key lengths of the shared key.

According to an embodiment of the invention, the maximum level of deviation from a uniform distribution is zero or close to zero. In other words, the binary representation of the set of credentials is uniformly distributed or close to a uniform distribution.

According to an embodiment of the invention, the predefined maximum level of deviation from a uniform distribution may be defined or determined by a set of stochastic tests, including their respective configurations which accept the generated binary representation of the set of credentials as sufficiently random, i.e. as sufficiently uniformly distributed.

According to an embodiment of the invention, the predefined maximum level of deviation from a uniform distribution determines or is defined by, respectively, the percentage of test keys that can be ruled out by a brute force attack due to the fact that a trial decryption results in an invalid set of credentials, i.e. in a decrypted message that does not look like a valid set of credentials.

According to an embodiment of the invention, the predefined maximum level of deviation from a uniform distribution is set in such a way that the level of randomness of the binary representation of the set of credentials is greater than zero.

According to an embodiment of the invention, the predefined maximum level of deviation from a uniform distribution is defined as a predefined minimum level of randomness of the binary representation of the set of credentials.

According to an embodiment of the first aspect of the invention, the method further comprises the step of providing a decrypted credential from the credential user to the credential issuer for verification purposes, wherein the credential issuer is provided for allowing only a predefined number of verification trials.

The smaller the predefined number of verification trials, the smaller the chance that an attacker might find the shared key before the credential issuer shuts down the respective account. As the binary representation of the credentials comprises the predefined maximum level of deviation from a uniform distribution, the attacker cannot rule out any or only a sufficiently small number of shared keys by means of the output structure of a sample decrypted with a trial shared key. In other words, the attacker needs the verification feedback of the credential issuer to verify whether a chosen trial shared key matches or can be ruled out.

According to an embodiment of the first aspect of the invention, the predefined maximum level of deviation from a uniform distribution of the binary representation of the set of credentials is determined by a predefined security level, the key-lengths of the shared key and the predefined number of verification trials.

According to this embodiment of the first aspect of the invention, the predefined maximum level of deviation from a uniform distribution is chosen or determined or set in dependence on three different parameters. The predefined security level serves as a first parameter. This predefined security level can be set or chosen by the credential issuer and may be defined by the probability that a brute force key search attack is successful. Preferably the credential issuer will set or determine the predefined security level in dependence on the application and the demands of his customers.

The second parameter that determines or influences the predefined maximum level of deviation from a uniform distribution is the key-lengths of the shared key. The longer the shared key, the greater the key space and the more trial keys an attacker that performs a brute force key search attack has to choose from.

The third parameter that determines or influences the predefined maximum level of deviation from a uniform distribution is the predefined number of verification trials. The smaller the predefined number of verification trials, the smaller the chance that a brute force key search attack is successful.

All these three parameters interactively influence or determine the predefined maximum level of deviation from a uniform distribution.

According to an embodiment of the first aspect of the invention, the shared key is a weak key.

A weak key is understood as a cryptographically weak key with respect to a brute force key search attack, i.e. a brute force search of the key space. Such a brute force key search attack may be based on a binary representation of a set of credentials that comprise a sufficient level of redundancy or structure to rule out wrong trial keys. Such a brute force key search attack could be performed by a man-in-the-middle attacker that intercepts a message containing a set of credentials. The attacker may try to distinguish the decrypted samples by analyzing the structure of the resulting output. In other words, the attacker knows that the plain text message containing the set of credentials has a certain structure or character distribution. Wrong guesses of the weak key that do not produce this known structure or character distribution and that produce a uniform or close to uniform distribution of zeros and ones can be ruled out.

With such a brute force key search attack, there is a continuum of resistance against the attack depending on the length of the used key. In other words, a weak key according to an embodiment of the invention is a key with a small key size or a short key length. Usually a key is considered a weak key if a brute force attack is computationally infeasible to carry out.

In general, with the technological development of computing power, the key-lengths of a key that is considered as a cryptographically strong key will become longer and longer and, accordingly, the key lengths of a key that is considered as a weak key will become longer and longer as well.

Currently for many applications a cryptographically strong key is considered as a key with at least 112 bits, e.g. a 2 key-Triple DES (Data Encryption Standard)-key.

Accordingly, a weak key according to an embodiment of the invention is understood as a key with less than 112 bits.

The Advanced Encryption Standard (AES) currently uses a key size with a minimum of 128 bits. Accordingly, a weak key according to another embodiment of the invention is understood as a key with less than 128 bits.

The US government uses 192 or 256 bit AES keys for top secret data. Accordingly, a weak key according to another embodiment of the invention is understood as a key with less than 192 or 256 bits.

Using a weak key for encrypting the set of credentials has the advantage of facilitating the user input during setup or customization of some software on the user device. This is in particular useful for user devices with a limited keypad or display such as a mobile phone.

According to an embodiment of the invention, the shared key comprises 10 bits or less than 10 bits. According to another embodiment of the invention, the shared key comprises 20 bits or less than 20 bits. According to another embodiment of the invention, the shared key comprises 50 bits or less than 50 bits. According to another embodiment of the invention, the shared key comprises 100 bits or less than 100 bits. The respective key lengths can be chosen in dependence on the predefined maximum level of deviation from a uniform distribution of the binary representation of the set of credentials, the predefined security level and the predefined number of verification trials. Using such short shared keys is facilitated by setting the predefined maximum level of deviation from a uniform distribution for the binary representation of the set of credentials.

According to an embodiment of the first aspect of the invention, the second channel comprises a manual user interface. The manual user interface may be provided on the user device. Providing a manual user interface in the second channel has the advantage of allowing the method to be broadly applicable because manual user interfaces are part of most electronic devices.

According to an embodiment of the first aspect of the invention, the method further comprises the steps of:
  generating and displaying the shared key by the user device,
  manually entering the shared key by the credential user on a further device,
  transferring the shared key from the further device to the credential issuer.

In this embodiment, the shared key is generated by the user device and then distributed to the credential issuer. This gives the credential user enhanced flexibility and allows him to spontaneously initiate a shared key distribution. The further device may be a computer.

According to an embodiment of the first aspect of the invention the method further comprises the steps of:
  generating the shared key by the credential issuer,
  transferring the shared key from the credential issuer to the further device,
  displaying the shared key by the further device,
  manually entering the shared key by the user on the user device.

In this embodiment the shared key is generated by the credential issuer and then distributed to the user device of the credential user. This gives the credential issuer enhanced flexibility. The further device may be a computer.

According to an embodiment of the first aspect of the invention, the credentials comprise a predefined number of credential symbols and the credential symbols are elements of a credential alphabet.

As an example, a credential could be a transaction number (TAN) consisting of e.g. 6 decimal numbers. In this example, the decimal numbers 0-9 are the credential symbols that establish the credential alphabet.

According to an embodiment of the first aspect of the invention, the size of the credential alphabet is chosen as a power of two.

This has the advantage that the binary representation of the credential alphabet can be implemented without any redundancy or structure. In other words, each credential symbol corresponds to a specific binary representation. The chosen binary encoding scheme does not comprise any binary representations that do not correspond to a valid credential.

As an example, the credential alphabet could be established by the 16 hexadecimal numbers 0-9 and A-F. Each of these hexadecimal numbers is converted to a binary (dual) representation of 4 bits. There are $2^4=16$ binary combinations for the 4 bits and each of them correspond to one hexadecimal number.

According to an embodiment of the first aspect of the invention, the method further comprises the step of adding noise symbols to the set of credentials.

Noise symbols are symbols that do not represent valid credentials. Adding noise symbols has the advantage that an attacker that performs a brute force attack cannot simply rule out binary representations that do not correspond to a valid credential symbol.

According to an embodiment of the first aspect of the invention, the noise symbols are derived from a noise alphabet consisting of credential symbols and one or more noise symbols, wherein the size of the noise alphabet is chosen as a power of two.

As an example, the credential symbols could be represented by the decimal numbers 0-9 of the hexadecimal system and the noise symbols by the characters A-F. According to this notation, the whole hexadecimal alphabet comprises the credential symbols 0-9 and the noise symbols A-F establishes the noise alphabet.

Using a noise alphabet with a size of a power of two has the advantage that the binary representation of the noise alphabet can be implemented without any redundancy or structure. In other words, each credential symbol and each noise symbol corresponds to a specific binary representation and the chosen binary encoding scheme does not comprise any binary representations that do not correspond to a noise symbol or a credential symbol.

According to an embodiment of the first aspect of the invention the method further comprises the steps of
  generating a set of credentials comprising a predefined number of credential symbols,
  generating a random message consisting of dummy credential symbols and noise symbols derived from the noise alphabet, wherein the number of dummy credential symbols is greater or equal to the predefined number of credential symbols of the set of credentials,
  replacing in the random message a predefined set of the dummy credential symbols by the credential symbols of the set of credentials,
  generating a binary representation of the random message, thereby establishing a binary representation of the set of credentials with the predefined maximum level of deviation from a uniform distribution.

This embodiment of the invention has the advantage that the generation of the set of credentials can be performed independently from the generation of the binary representation. This allows for generating the set of credentials by a unit or entity that is separated from the unit or entity that performs the generation of the binary representation. This allows for generating the set of credentials in a secure and closed environment and to keep the algorithm that performs the generation of the set of credentials secret.

As an example, a first processing unit could perform the generation of the set of credentials. This first processing unit could be arranged in a high-security area of the credential issuer. The first processing unit sends or forwards this set of credentials to a second processing unit that generates the binary representation of the set of credentials with the predefined maximum level of deviation from a uniform distribution.

According to an embodiment of the first aspect of the invention the generation of the binary representation of the set of credentials with the predefined maximum level of deviation from a uniform distribution comprises the sub-steps of:

generating a first representation of the set of credentials with a first level of randomness, transforming the first representation into a second representation of the set of credentials with a second level of randomness, wherein the second level of randomness is higher than the first level of randomness, transforming the second representation of the set of credentials into the binary representation with the predefined maximum level of deviation from a uniform distribution.

According to this embodiment of the invention the binary representation of the set of credentials is generated by three steps. In a first step the first representation with the first level of randomness is generated. The first level of randomness corresponds to a first level of deviation from a uniform distribution. In a subsequent second step this first representation is transformed into a second representation that comprises a higher level of randomness. The second level of randomness corresponds to a second level of deviation from a uniform distribution. The second level of deviation from a uniform distribution is lower than the first level of deviation from a uniform distribution. In other words, in the second step, structure or redundancy is removed from the first representation. In the third step, the second representation is transformed into the binary representation with the predefined maximum level of deviation from a uniform distribution. The maximum level of deviation from a uniform distribution corresponds to a minimum level of randomness.

The first and the second representation are preferably non-binary representations. By means of the third step these non-binary representations can be converted into a binary representation.

According to an embodiment of the first aspect of the invention, the set of credentials are divided into units for binary conversion, wherein the units for binary conversion are chosen in such a way that the proportion of binary representations that do not represent credential symbols is smaller than a predefined proportion.

By means of a brute force attack, an attacker can only rule out trial decryptions that do not represent valid credential symbols. Hence limiting the proportion of such representations reduces the susceptibility to brute force attacks. As an example, the predefined proportion could be set to 1%, meaning that a maximum of 1% of the binary representations of the chosen unit for binary conversion represent no valid credentials symbols. Other exemplary embodiments of the invention may use as predefined proportions e.g. the values 0.01%, 0.0001% or 5%.

According to an embodiment of the first aspect of the invention, the set of credentials are divided into units for binary conversion that each comprise two or more credential symbols.

Using units for binary conversion that comprise two or more credential symbols improves the flexibility and increases the possible number of units. This offers more possibilities to choose a good or optimal unit for binary conversion that introduces no or little redundancy. If the set of credentials is a TAN-list, e.g. 3 or 6 decimal digits, the decimal digits could establish a unit for binary conversion.

According to an embodiment of the first aspect of the invention, the first channel is an untrusted channel and the second channel is a trusted channel.

An untrusted channel is understood as a channel which the credential user and/or the credential issuer do not trust. An untrusted channel is susceptible for a man-in-the-middle attacker. A trusted channel is understood as a channel which the credential user and the credential issuer trust.

According to an embodiment of the first aspect of the invention the credentials are one time authentication codes. Such one time authentication codes could be e.g. TANs for online banking transactions.

According to an embodiment of the first aspect of the invention, the first channel is a wireless communication channel and the second channel comprises one of a secure internet connection, a phone line and a mail service.

Such channels are widely spread and allow broad use of the method.

According to an embodiment of the first aspect of the invention the user device comprises one of a mobile phone and a personal digital assistant.

Such devices are widely spread and allow broad use of the method.

According to an embodiment of the invention, the user device is a trusted device. A trusted device is understood as a device that the credential user trusts. Preferably a trusted device is owned and/or controlled by the credential user. Preferably the credential issuer trusts the trusted device as well.

According to an embodiment of the invention, a binary representation with a uniform distribution is defined as a distribution in which the binary values one and zero are equally probable.

According to a second aspect of the invention, there is provided a method for distribution of a set of credentials from a credential issuer to a credential user, wherein the credential user is provided with a user device, wherein a first channel and a second channel are provided for communication between the user device and the credential issuer, wherein the method comprises, in a credential server, the steps of:

generating a shared key and distributing the shared key to the user device or receiving a shared key from the user device via the second channel, generating a binary representation of the set of credentials with a predefined maximum level of deviation from a uniform distribution, encrypting the binary representation of the set of credentials by means of the shared key, distributing the encrypted set of credentials via the first channel to the user device.

This aspect of the invention relates to method steps performed by the credential server.

According to a third aspect of the invention there is provided a computer program comprising instructions for carrying out the steps of the method according to the second aspect of the invention when said computer program is executed on a computer system.

The computer system may be established by the credential server.

According to a fourth aspect of the invention, there is provided a method for receiving a set of credentials from a credential server by a user device, wherein a first channel and a second channel are provided for communication between the user device and the credential server, wherein the method comprises, in the user device, the steps of:

generating a shared key and distributing the shared key to the credential server or receiving a shared key from the credential server via the second channel, receiving a binary representation of the set of credentials with a predefined maximum level of deviation from a uniform distribution, wherein the binary representation of the set of credentials is encrypted by means of the shared key, decrypting the encrypted set of credentials by means of the shared key, storing the decrypted set of credentials.

This aspect of the invention relates to method steps performed by the user device.

According to a fifth aspect of the invention there is provided a computer program comprising instructions for carrying out the steps of the method according to the fourth aspect of the invention when said computer program is executed on a computer system.

The computer system may be established by the user device.

According to a sixth aspect of the invention, there is provided a method for securely sending a set of credentials from a credential issuer to a credential user via an untrusted channel, the method comprising the steps of generating a binary representation of the set of credentials with a predefined maximum level of deviation from a uniform distribution, encrypting the binary representation of the set of credentials by means of a shared key, sending the encrypted set of credentials via the untrusted channel from the credential issuer to the credential user.

This aspect of the invention relates to a method for securely sending a set of credentials from a credential issuer to a credential user via an untrusted channel. The distribution of the shared key is not within the subject matter of the invention. It is assumed that the credential issuer and the credential user possess a shared key.

According to a seventh aspect of the invention, there is provided a computer program comprising instructions for carrying out the steps of the method according to the sixth aspect of the invention when said computer program is executed on a computer system.

The computer system may be established by a credential server of the credential issuer.

According to another aspect of the invention, there is provided a system for distribution of a set of credentials from a credential issuer to a credential user, wherein the credential user is provided with a user device, wherein a first channel and a second channel are provided for communication between the user device and the credential issuer, the system being provided for:

distributing a shared key between the user device and the credential issuer by means of the second channel, generating a binary representation of the set of credentials with a predefined maximum level of deviation from a uniform distribution, encrypting the binary representation of the set of credentials by means of the shared key, distributing the encrypted set of credentials via the first channel from the credential issuer to the user device, decrypting the encrypted set of credentials by the user device by means of the shared key.

According to another aspect of the invention, there is provided a credential server for distribution of a set of credentials to a credential user, wherein the credential user is provided with a user device, wherein a first channel and a second channel are provided for communication between the user device and the credential server, the credential server being provided for:

generating a shared key and distributing the shared key to the user device or receiving a shared key from the user device via the second channel, generating a binary representation of the set of credentials with a predefined maximum level of deviation from a uniform distribution, encrypting the binary representation of the set of credentials by means of the shared key, distributing the encrypted set of credentials via the first channel from the credential issuer to the user device.

According to another aspect of the invention, there is provided a user device provided for receiving a set of credentials from a credential server, wherein a first channel and a second channel are provided for communication between the user device and the credential server, the user device being provided for:

generating a shared key and distributing the shared key to the credential server or receiving a shared key from the credential server via the second channel, receiving a binary representation of the set of credentials with a predefined maximum level of deviation from a uniform distribution, wherein the binary representation of the set of credentials is encrypted by means of the shared key, decrypting the encrypted set of credentials by means of the shared key, storing the decrypted set of credentials.

The steps of the different aspects of the invention can be performed in different orders. Furthermore, the steps may also be combined, e.g. that two or more steps are performed together.

Any of the device features may be applied to the method aspect of the invention and vice versa. Advantages of the device features apply to corresponding method features and vice versa.

BRIEF DESCRIPTION OF THE SEVERAL VIEWS OF THE DRAWINGS

Preferred embodiments of the invention are described in detail below, by way of example only, with reference to the following schematic drawings.

The drawings are provided for illustrative purpose only and do not necessarily represent practical examples of the present invention to scale. In the figures, same reference signs are used to denote the same or like parts.

FIG. 2 is a block diagram of a smart card of the system;

FIG. 3 is a block diagram of a user device of the system;

FIG. 4 is a block diagram of a server computer system of the system;

DETAILED DESCRIPTION OF THE INVENTION

Figure 1:
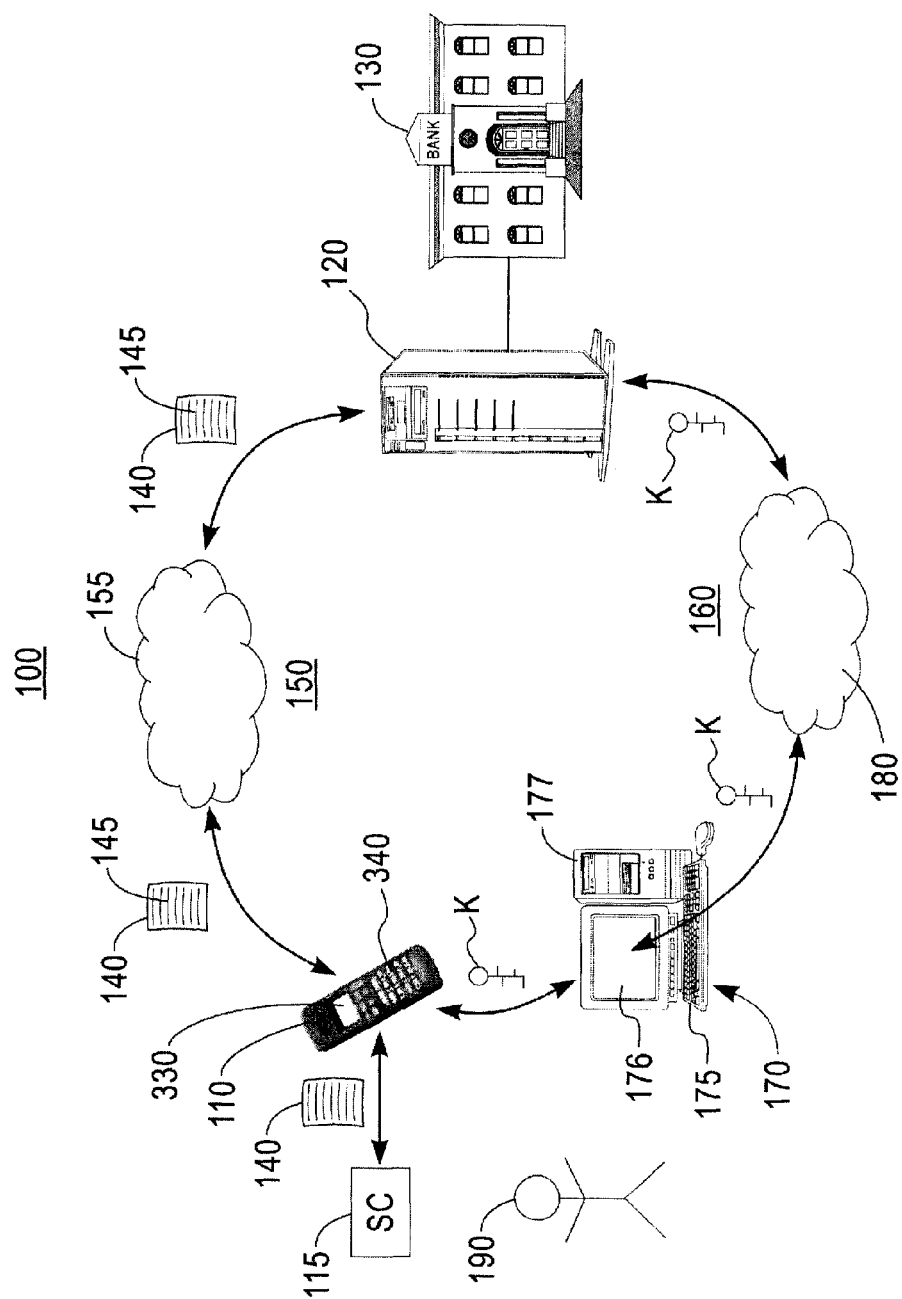
FIG. 1 is a block diagram of a system according to an embodiment of the present invention.

FIG. 1 shows a system 100 according to an embodiment of the present invention. The system 100 comprises a user device 110. In this exemplary embodiment of the invention the user device 110 is a mobile phone. Other examples of user devices 110 comprise Personal Digital Assistants (PDAs), wired or cordless phones or any other user devices. The user device 110 comprises a smart card 115.

The system 100 comprises as server a server computer system 120 that is allocated to a credential issuer 130. The credential issuer 130 may be e.g. a bank, an insurance company, an internet store or a service entity that offers services. The credential issuer 130 is provided for issuing a set 140 of credentials 145, in particular a set of one-time credentials. The credentials 145 can be used as verification or authentication means, e.g. to access a service of the credential issuer 130 or to perform a transaction with the credential issuer 130. The credential issuer 130 may comprise several server computer systems 120, e.g. a first server computer system for generating and distributing the credentials and a second server computer system for verifying the credentials. In this exemplary embodiment of the invention it is assumed that the one shown server computer system 120 performs the generation, distribution and verification of the credentials 145. According to an embodiment of the invention the set 140 of credentials 145 is a Transaction Number (TAN)-list. Each TAN of the TAN-list represents a credential 145, while the TAN-list represents a set 140 of the credentials 145.

A first channel 150 is established for communication between the user device 110 and the server computer system 120. The first channel 150 comprises a communications network infrastructure 155. The communications network infrastructure 155 may be a wireless access network, e.g. a mobile phone network such as a GSM network.

A second channel 160 is established for communication between the user device 110 and the server computer system 120. The second channel 160 according to this embodiment of the invention comprises as a further device, a client computer system 170 connectable to the server computer system 120. The client computer system 170 comprises a display 176, a computer 177 and as manual user interface a keyboard 175. According to other embodiments of the invention the further device may be a Personal Digital Assistant (PDA), a wired or cordless phone or a mobile phone. The client computer system 170 may communicate with the server computer system 120 by means of a communication network infrastructure 180. The communication network infrastructure 180 may be in particular the internet The communication network infrastructure 180 may be in particular a secure or trusted internet connection such as a SSL-connection. According to other embodiments of the invention the communication network infrastructure 180 may comprise a wireless access network, e.g. a mobile phone network or a wired telephone network.

The user device 110 and the client computer system 170 are allocated to a credential user 190. The credential user 190 may be a person or entity that wants to use credentials 145 for performing a transaction or accessing a service of the credential issuer 130.

A manual user interaction of the credential user 190 is provided for communication between the client computer system 170 and the user device 110. This manual user interaction is part of the second channel 160. According to the embodiment of FIG. 1 the second channel 160 is provided with a manual user interface in form of a keypad 340 of the user device 110. Furthermore, the user device 110 comprises a display 330.

In order to transfer information from the client computer system 170 to the user device 110, the respective information can be displayed on the display 176 of the client computer system 170. The credential user 190 reads the displayed information on the display 176 and enters the information into the user device 110 by means of the keypad 340. In order to transfer information from the user device 110 to the client computer system 170, the respective information can be displayed on the display 330 of the user device 110. The credential user 190 reads the displayed information on the display 330 and enters the information into the client computer system 170 by means of the keyboard 175.

The system 100 is provided for distribution of the set 140 of credentials 145 from the credential issuer 130 to the credential user 190. The second channel 160 is provided for distribution of a shared key K between the user device 110 and the credential issuer 130. The shared key K is in particular a weak key. This distribution of the shared key K provides an initial setup for credential distribution between the credential user 190 and the credential issuer 130.

According to one embodiment of the invention, the shared key K is generated by the server computer system 120 of the credential issuer 130. Then the shared key K is sent from the server computer system 120 via the communications network infrastructure 180 to the client computer system 170. Then the shared key is displayed on the display 176 of the client computer system 170, read by the credential user 190 and manually entered into the user device 110 by the credential user 190 via the keypad 340. As the shared key K may be a weak and hence a short key, it can be conveniently entered by means of the keypad 340.

According to another embodiment of the invention, the shared key K is generated by the user device 110. Then the shared key K is displayed on the display 330 of the user device 110, read by the credential user 190 and manually entered into the client computer system 170 by the credential user 190 by means of the keyboard 175. Then the shared key K is sent from the client computer system 170 to the server computer system 120 via the communications network infrastructure 180.

As the shared key K may be a weak and hence a short key, it can be conveniently read on the display 330 and conveniently entered by means of the keyboard 175.

As a result of both embodiments, the credential issuer 130 and the credential user 190 have the shared key K and can use this shared key K for the exchange of encrypted information, in particular for the exchange of encrypted credentials, via the first channel 150.

The server computer system 120 is provided for generating a binary representation of the set 140 of credentials 145 with a predefined maximum level of deviation from a uniform distribution. The server computer system 120 is further provided for encrypting this binary representation with the predefined maximum level of deviation from a uniform distribution by means of the shared key K. Then the encrypted set 140 of credentials 145 is sent via the first channel 150 from the server computer system 120 to the user device 110. In the user device 110 the encrypted set 140 of credentials 145 is decrypted by means of the shared key K and stored in the user device 110, in particular in the smart card 115.

FIG. 2 shows the smart card 115 of the user device 110 in more detail.

The smart card 115 comprises a memory 200, a central processing unit (CPU) 210, an encryption engine 220, and an input/output (I/O) subsystem 230, all interconnected via a bus subsystem 240. In the memory 200 is stored computer program code executable by the CPU 210. The computer program code comprises an operating system 250 in the form of a Java compatible operating platform and a tool kit 260. The tool kit 260 establishes application software in the form of a Java applet. The memory 200 also facilitates the storage of a set 140 of credentials 145 in a tamper resistant manner. The set 140 of credentials 145 is also denoted as SC. The operating system 250 configures the CPU 210 for executing the tool kit 260. The tool kit 260 facilitates handling of the credentials 145 in the set of credentials 140. Aspects of the functionality of the tool kit 260 will be described in detail shortly. The encryption engine 220 comprises cryptographic processing logic for encrypting and decrypting data to be transmitted from and received by the smart card 115. The cryptographic processing logic may be implemented in hardware, software, or hardware and software in combination.

FIG. 3 shows the user device 110 in more detail. The user device 110 comprises a radio frequency (RF) stage 300 having an RF antenna 310, control logic 320, the visual display 330 and the keypad 340 all interconnected by a bus subsystem 350. The smart card 115 is removeably inserted into the user device 110 and the I/O subsystem 230 of the smart card 115 is releasably connected to the bus subsystem 350 of the user device 110. In operation, the RF stage 300 and RF antenna 310 facilitate wireless communications between the user device 110 and other devices connected to the first channel 150. The visual display 330 provides a graphical user interface between the user and the user device 110 for functions such as preparing messages and reading messages. The key pad 340 provides the user with keyboard control of the user device 110 for functions such as data entry and call handling. The control logic 320 controls functions of the user device 110 such as call handling based on inputs received from, for example, the keypad 340. Outputs from the user device 110, such as data displays on the visual display 330 or outgoing calls via the RF stage 300, are also controlled by the control logic 320.

Similarly, the control logic 320 coordinates transfers of data from the smart card 115 and the other elements of the user device 110 via the bus subsystem 350. The control logic 320 may be implemented in dedicated hardware, a programmed CPU, or a combination of a dedicated hardware and a programmed CPU.

FIG. 4 shows the server computer system 120 in more detail. The server computer system 120 comprises a memory 400, a CPU 410, and an I/O subsystem 420 all interconnected by a bus subsystem 430. In the memory 400 is stored computer program code executable by the CPU 410. The computer program code comprises an operating system 440 and credential service application software (CSAS) 450. The operating system 440 configures the CPU 410 for executing the credential service application software 450. The credential service application software 450 facilitates handling of the set 140 of credentials 145. Aspects of the functionality of the credential service application software 450 will be described in detail shortly.

In operation, the first channel 150 is established between the user device 110 and the server computer system 120. The first channel 150 facilitates a transfer of the set 140 of credentials 145 from the credential service application software 450 in the server computer system 120 to the smart card 115 in the user device 110. The tool kit 260 may be loaded into the memory 200 of the user device 110 during configuration of the smart card 115 for the user. Alternatively the tool kit 260 may be loaded into the memory 200 and refreshed dynamically via the first channel 150. Access to the tool kit 260 in the memory 200 is protected by a PIN set by the credential user 190 via the user device 110. The keypad 340 may be employed for this purpose. Alternatively, if the user device 110 has voice recognition, the PIN may be set and reset orally. Other devices may support still further means of data entry.

Figure 5:
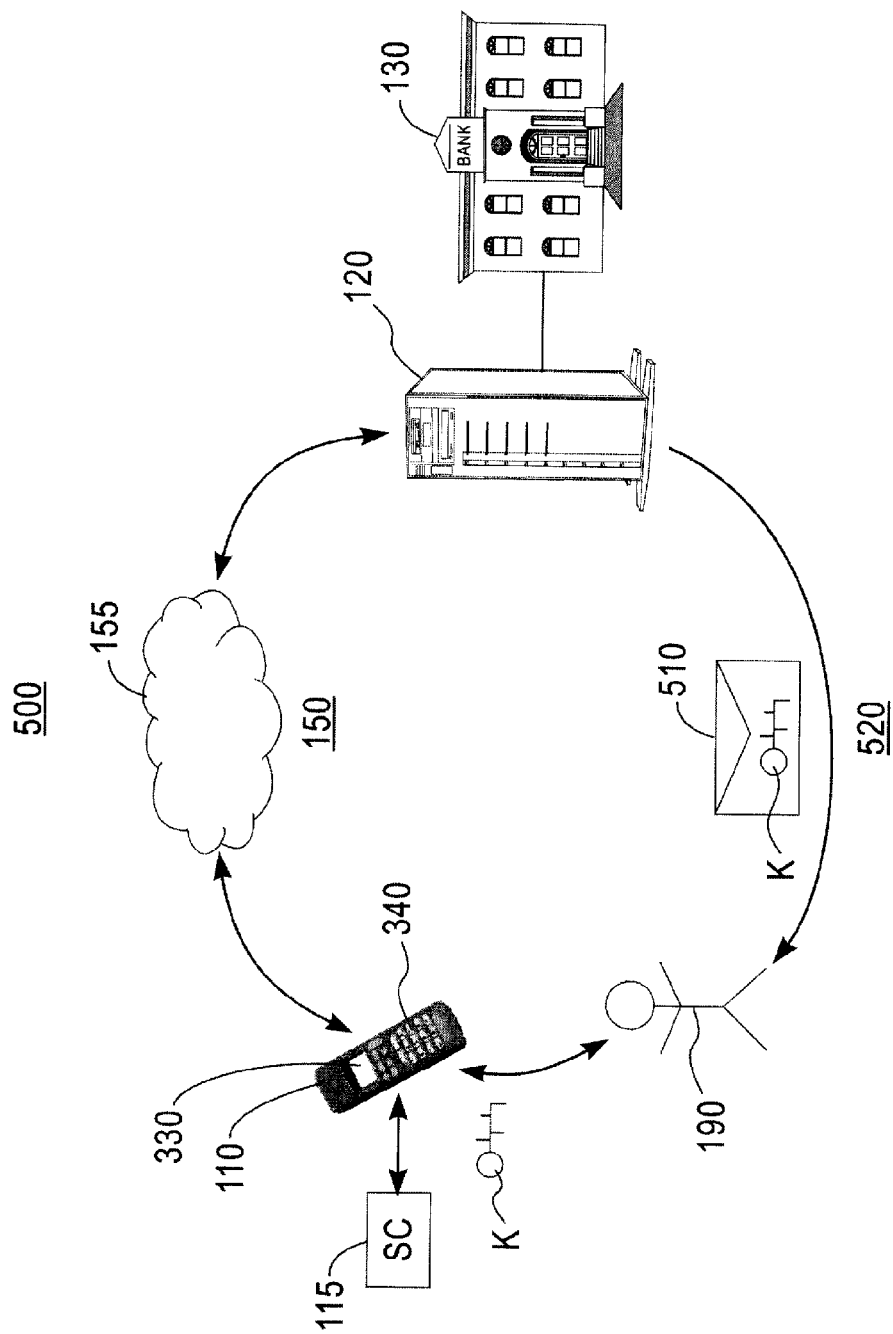
FIG. 5 is a block diagram of another system according to an embodiment of the present invention.

FIG. 5 shows a system 500 according to another embodiment of the present invention. The first channel 150 of the system 500 is implemented in the same way as shown with reference to FIG. 1 Hence the same reference numerals are used for the elements of the first channel 150. A second channel 520 is implemented in a different way than the second channel 160 of FIG. 1. The second channel 520 comprises a paper mail system. The paper mail may be supplied via, for example, the conventional postal system. The paper mail contains the shared key K to be distributed between the credential issuer 130 and the credential user 190. The shared key K is generated by the credential issuer 130 or the server computer system 120 respectively. It is then send by paper mail to the credential user 190. The credential user 190 is provided for opening the paper mail, reading the shared key K and manually entering the shared key K into the user device 110 by means of the keypad 340.

Figure 6:
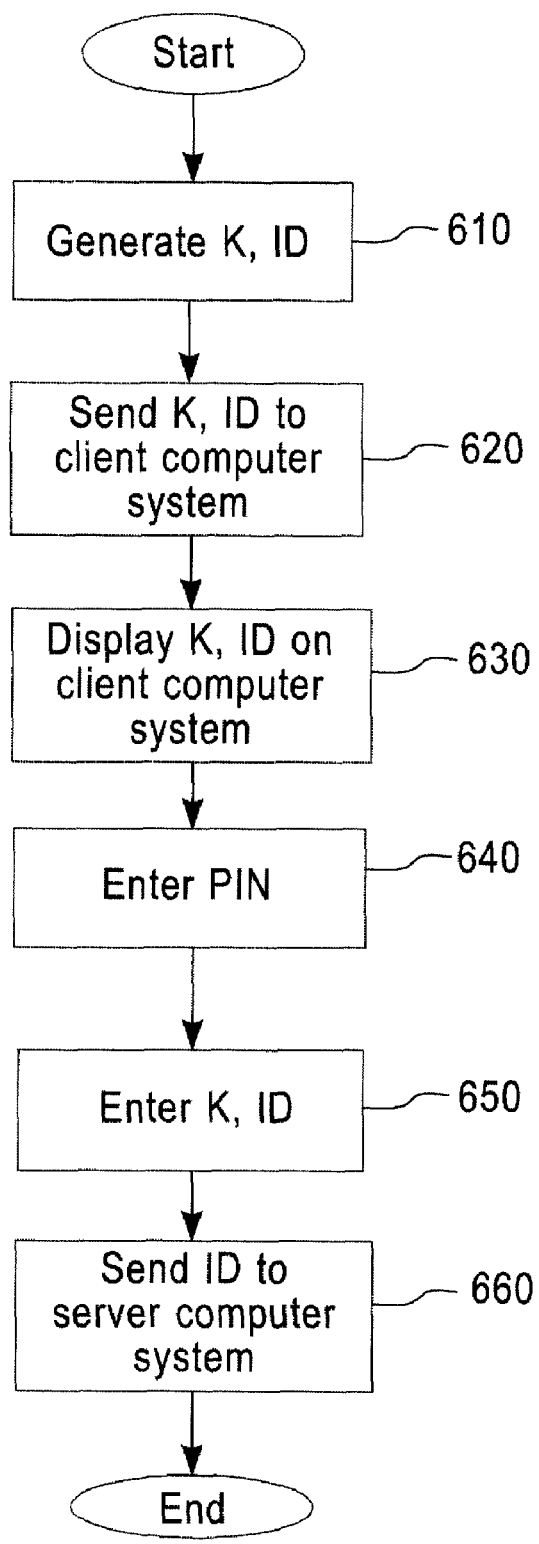
FIG. 6 is a flow chart associated with the smart card.

In the following with reference to FIG. 6, a flow chart for initial generation and distribution of the shared key K and for activation of the tool kit 260 of the smart card 115 is explained in more detail. The flow chart of FIG. 6 is based on the system 100 as described above with reference to FIG. 1.

In step 610 the server computer system 120 generates a shared key K and a credential user identification code ID. The credential user identification code ID is provided for identifying the respective credential user 190 and for allocating a set 140 of credentials 145 and the generated shared key K to the corresponding credential user 190.

In step 620 the shared key K and the corresponding credential user identification code ID is sent via the communication network infrastructure 180 to the client computer system 170. In step 630 the shared key K and the credential user identification code ID are displayed on the display 176 of the client computer system 170.

In step 640 the credential user 190 enters the PIN via the key pad 340. On receipt of the PIN, the tool kit 260 requests that the credential user 190 enters the shared key K and the credential user identification code ID. In step 650 the credential user 190 enters the shared key K and the credential user identification code ID via the key pad 340. Again, if the user device 110 has voice recognition, this data may be entered orally. However, it will be appreciated that this is a less secure entry technique as the user may be overheard reciting the data. On receipt of the above-listed user entries, the tool kit 260 sends in step 660 an initialization message, e.g. a SMS message, containing the credential user identification code ID to the credential service application software 450 on the server computer system 120. The initialization message indicates to credential service application software 450 that the tool kit 260 has been enabled.

Figure 7:
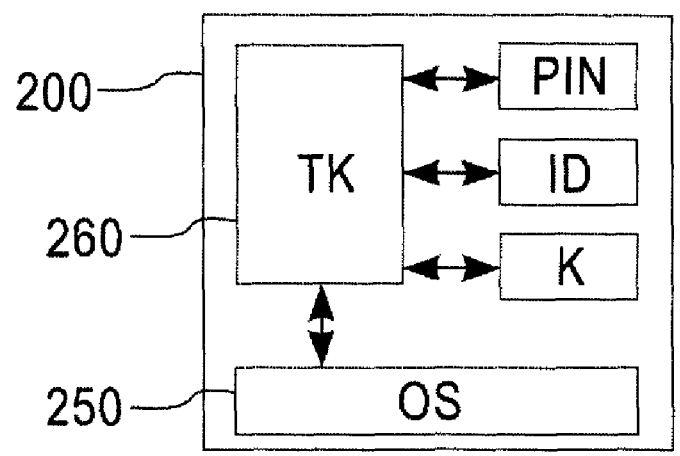
FIG. 7 is a block diagram of the smart card memory.

With reference to FIG. 7, the memory 200 on the smart card 115 now contains the PIN, the shared key K and the credential user identification code ID.

Figure 8:
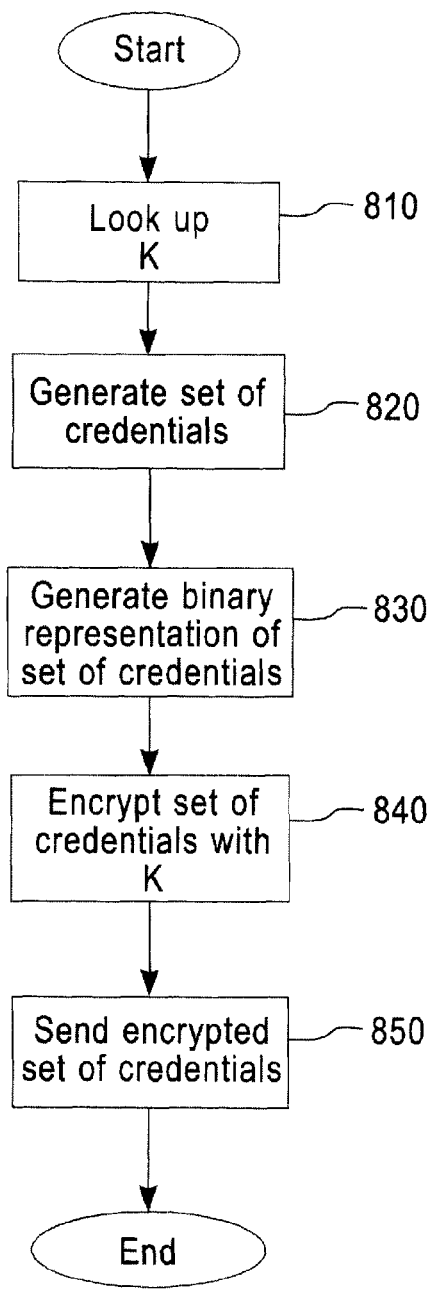
FIG. 8 is a flow chart associated with the server computer system.

Referring to FIG. 8, on receipt of the initialization message at the server computer system 120, the credential service application software 450 looks up in step 810 the respective credential user 190 by means of the credential user identification code ID and retrieves the shared key K issued for the credential user 190. Then the credential service application software 450 generates in step 820 a set 140 of credentials 145 in a non-binary representation, e.g. a TAN-list in the decimal numeral system. In step 830 a binary representation of the set 140 of credentials 145 with a predefined maximum level of deviation from a uniform distribution is generated. In other words, the non-binary representation of the set 140 of credentials 145 is transformed into a binary representation of zeros and ones that is distributed with the predefined maximum level of deviation from a uniform distribution. In step 840, this binary representation with the predefined maximum level of deviation from a uniform distribution is encrypted with the shared key K. In step 850, the encrypted set 140 of credentials 145 is sent from the server computer system 120 to the user device 110 via the first channel 150.

Figure 10:
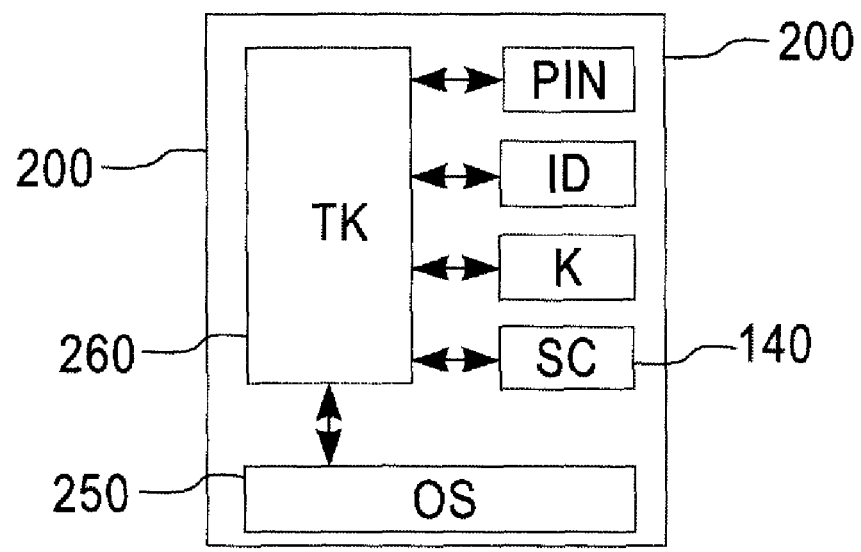
FIG. 10 is another block diagram of the smart card memory.
Figure 9:
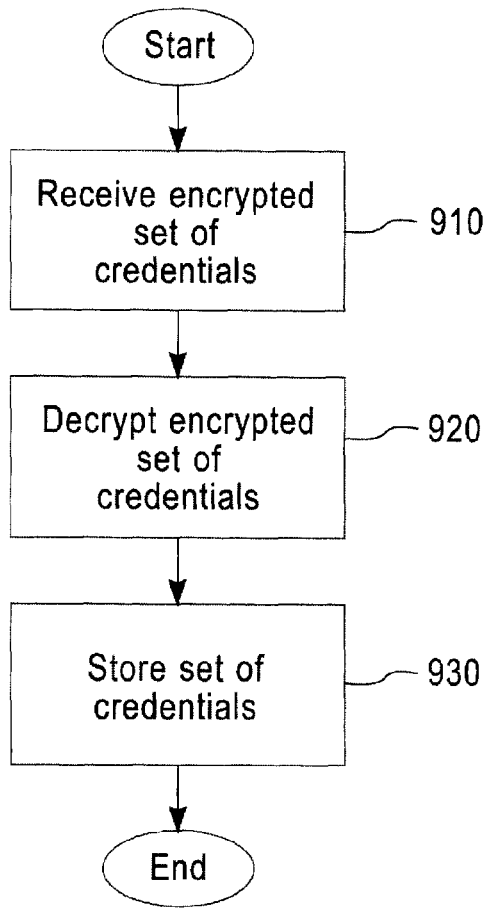
FIG. 9 is another flow chart associated with the smart card.

Turning to FIG. 9, the encrypted set 140 of credentials 145 is received at the user device 110 in step 910. In step 920, the tool kit 260 decrypts the encrypted set of credentials. The tool kit 260 utilizes the encryption engine 220 to decrypt the encrypted set 140 of credentials 145 by means of the shared key K. The tool kit 260 then stores in step 930 the decrypted set 140 of credentials 145 in the memory 200. Initialization is then complete. With reference to FIG. 10, the memory 200 now contains the shared key K, the PIN, the credential user identification code ID and the set 140 of credentials 145.

Figure 11:
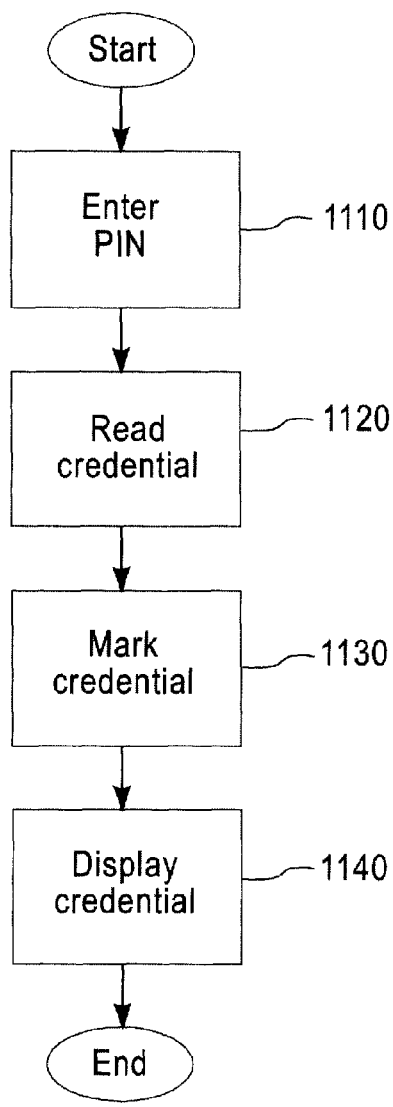
FIG. 11 is yet another flow chart associated with the smart card.

Referring now to FIG. 11, when the credential user 190 needs a credential 145 to perform a banking transaction for example, the credential user 190 again enters in step 1110 the PIN via the key pad 340 to unlock the tool kit 260. The credential user 190 then requests and reads in step 1120 a credential 145 from the tool kit 260. The credential 145 may be the next credential in the set 140 of credentials 145 or a specific credential 145, depending on the credential allocation system employed by the credential issuer 130. The tool kit 260 tracks and/or marks the issued credentials 145 in step 1130. The user device 110 displays in step 1140 the respective credential 145 on the display 330 and the credential user 190 may read and use this credential 145 for performing transactions with the credential issuer 130. For displaying the credentials 145 in a non-binary form to the credential user 190, the tool kit 260 or a decoding unit of the user device 110 retransforms or reconverts the binary representation of the set 140 of credentials 145 back into a non-binary representation. In other words the tool kit 260 or the decoding unit decodes the binary representation of the set 140 of credentials 145. The tool kit 260 or the decoding unit of the user device 110 has a respective decoding tool or a respective decoding engine.

Figure 12:
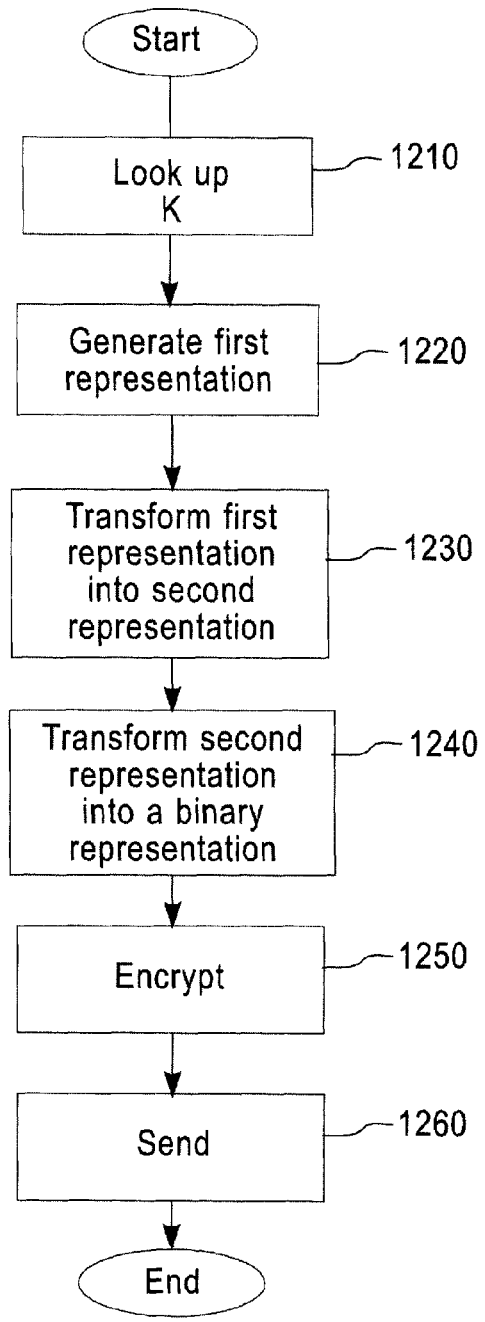
FIG. 12 is another flow chart associated with the server computer system.
Figure 13:
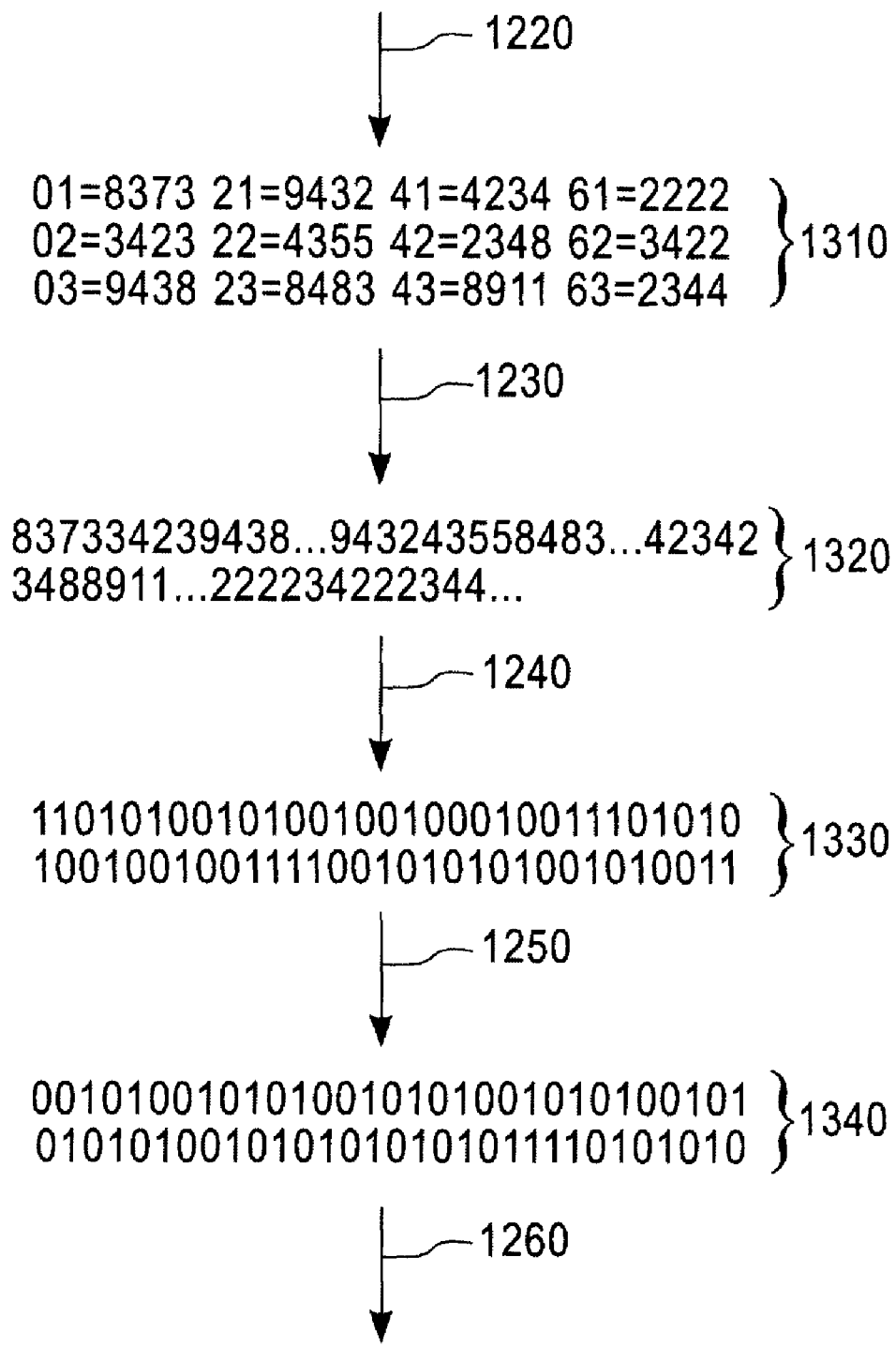
FIG. 13 is yet another flow chart associated with the server computer system.

FIG. 12 shows a flow chart of a method for generating a binary representation of a set of credentials performed by the server computer system 120 according to an embodiment of the invention. FIG. 13 shows corresponding exemplary embodiments of representations of a set of credentials.

On receipt of a initialization message from the user device 110 at the server computer system 120, the credential service application software 450 looks up in step 1210 the respective credential user 190 by means of the credential user identification code ID and retrieves the shared key K issued for the respective credential user 190.

In step 1220, a first representation of a set of credentials is generated. FIG. 13 shows as an example a first representation 1310. The set of credentials is a TAN-list. The first representation 1310 of the TAN-list comprises the individual TANs in a structured form and allocation. The individual TANs are ordered and provided with an order number. As an example, the first TAN 8373 is provided with the order number 01. The structure of this TAN-list results in a first level of randomness.

In a step 1230, the first representation 1310 of the TAN-list is transformed into a second representation 1320 of the TAN-list. In step 1230 the structured form and allocation of the TAN-list is removed from the first representation 1310. This is done by removing the order numbers and the structured allocation of the individual TANs and by just arranging the TANs one after the other without any intermediate space or structure. The second representation 1320 has a second level of randomness which is higher than the first level of randomness.

In step 1240, the second representation 1320 of the set of credentials is transformed into a binary representation 1330 with the predefined maximum level of deviation from a uniform distribution.

For step 1240, one of the below described methods for binary conversion or binary transformation can be used.

In step 1250, the binary representation 1330 with the predefined maximum level of deviation from a uniform distribution is encrypted by means of the shared key K. This results in an encrypted set of credentials 1340.

In step 1260, the encrypted set of credentials is sent from the server computer system 120 to the user device 110 via the first channel 150.

In the following, the steps of generating a binary representation of the set of credentials with a predefined maximum level of deviation from a uniform distribution are explained in more detail.

In general, a set of credentials to be transported over the first channel 150 comprises a set W of one or more words w, also denoted as strings w, constructed using an alphabet A.

Each word or string corresponds to a credential. The alphabet A establishes a credential alphabet or a credential character set respectively. The credential alphabet A is a finite set of symbols, also denoted as credential symbols. The credential symbols may be e.g. characters or digits. The words w can be concatenated to form a message M being a sequence of credential symbols over the credential alphabet A:

$A = \{a1, \ldots, ak\}$ credential alphabet with k credential symbols, $k >= 1$ $w = s1|s2| \ldots |sj$ word constructed by concatenating $j$ credential symbols $s$, $s$ element $A$, $j >= 1$; each word represents a credential.

$W = (w1, \ldots wq)$ set of q words, $q >= 1$, establishing a set of credentials.

$M = w1| \ldots |wq$ message consisting of $n$ credential symbols $s$, $s$ element $A$, $n = \text{sum}(q=1,q) j(wq)$ Instead of viewing the message M as a sequence of symbols, it can be viewed as a radix k number like this:

$M' = s1*k^0 + s2*k^1 + \ldots + s(n-1)*k^{(n-2)} + s(n)*k^{(n-1)}$

For the purpose of processing this message M in an encryption scheme and for sending it via the first channel 150 from the credential issuer 130 to the credential user 190, it needs to be converted to a binary representation:

$M'' = b(1)*2^0 + b(2)*2^1 + \ldots + b(r-1)*2^{(r-2)} + b(r)*2^{(r-1)}$ where b(i) is bit number i of M" and r is the bit length of the converted message and:

r is the minimum natural number with $r >= \ln 2(k^n)$

It is assumed that the credential symbols s(i) in M' are uniformly distributed. That is, each symbol a(i) in the credential alphabet A appears with a probability of 1/k.

If the credential alphabet A is not a power of two, the symbols 0 and 1 in the binary representation M" of the set of credentials appear with a probability of 50% but for the top most ln 2(k) bits.

For the following examples it is assumed that a bank as credential issuer 130 wants to ship a transaction number (TAN) list as set of credentials to a credential user 190. In this example a TAN is supposed to have 6 decimal digits and the TAN-list is supposed to comprise 100 TANs.

The set of credentials to be distributed via the first channel 150 from the credential issuer 130 to the credential user 190 comprises 600 random decimal digits. It is furthermore assumed that the shared key K is a 12 digit decimal number.

In order to evaluate the security level of the example, it is assumed that an attacker eavesdrops on the communication between the credential issuer 130 and the credential user 190 via the first channel 150. The attacker captures the encrypted message containing the encrypted set of credentials, namely the encrypted TAN-list. Now the attacker may run a brute force attack trying all keys in the key space and decrypt the encrypted message by means of the chosen test keys. By looking at the structure of the decrypted message, he may recognize if the decrypted message is a possible TAN-list. If the chosen test key is not the correct key, the data in the decrypted message will be random. This might be used by the attacker to rule out keys.

According to an embodiment of the invention, the TAN list is viewed as a sequence of 600 decimal numbers. The 600 decimal numbers are divided into 200 groups of three decimal digits. These 200 groups establish units for binary conversion. The binary representation of the TAN-list is generated by applying the following encoding or conversion scheme:

Each of the values 0-999 of the three decimal digits is encoded by means of a binary representation (a binary number) of 10 bits. In general a binary encoding scheme with 10 bits allows for encoding of $2^{10}=1024$ values. Thus there are some binary numbers (representations) that do not represent encoded TANs. This introduces some redundancy or structure in the binary representation of the TAN-list. However, the encryption or conversion scheme according to this embodiment of the invention is chosen in such a way that the binary representation of the TAN-list comprises a predefined maximum level of deviation from a uniform distribution. The predefined maximum level of deviation from a uniform distribution of the binary representation of the set of credentials is determined by a predefined security level, the key-lengths of the shared key K and a predefined number of verification trials. The predefined number of verification trials is the number of trials that the credential issuer 130 allows before he shuts down or closes the respective account of the credential user 190.

The security level of this exemplary embodiment of the invention can be determined as follows. Decrypting the encrypted TAN-list equals to rolling 200 dice with values from $0-(2^{10}-1)$. If all dice show only values from 0-999, the test key could be the real shared key. The chance that a single die shows a valid TAN value between 0 and 999 is: $Pu=10^3/2^{10}=97.66\%$. The likelihood that a trial decryption with a test key on an encrypted TAN-list shows only valid TANs, therefore, is:

$$Pl = Pu^{200} = 0.871\%$$

This means that of the $10^{12}$ possible test keys the attacker is able to rule out 99.129% of all candidate test keys, leaving him with 8.7 million possible keys. If the predefined number of verification trials of the retry counter of the credential issuer 130 for false TAN entries is e.g. 5, then the attacker has a chance of 5 out of 8.7 million to hit the right key. This chance corresponds to the security level of the system 100. In this example the security level could be increased by reducing the predefined number of verification trials, by increasing the key-lengths of the shared key or by reducing the (maximum) level of deviation from a uniform distribution of the binary representation of the TAN-list, i.e. by increasing the level of randomness of the binary representation of the TAN-list. By changing these three parameters, the credential issuer 130 can adapt and predefine the security level of the respective application.

According to another embodiment of the invention, each individual credential, i.e. in this example each individual TAN consisting of 6 decimal numbers, is transformed into a binary representation of 20 bits. Accordingly, the 600 decimal numbers are divided into 100 groups of 6 decimal digits. These 100 groups establish the units for binary conversion in this example. The binary representation of the TAN-list is generated by applying the following encoding scheme:

Encode each TAN($10^6$) into 20 bits of binary data.

In other words, each of the values 0-999999 of the six decimal digits is encoded by means of a binary representation (a binary number) of 20 bits. In general, a binary encoding scheme with 20 bits allows for the encoding of $2^{20}=1048576$ values. Thus there are again some binary numbers that do not represent encoded TANs. This introduces some redundancy or structure in the binary representation of the TAN-list.

The security level of this exemplary embodiment of the invention can be determined as follows. Decrypting the encrypted TAN-list equals rolling 100 dice with values from $0-(2^{20}-1)$. If all dice show only values from 0-999999, the test key could be the real (weak) shared key. The chance that a single die shows a valid TAN value between 0 and 999999 is: $Pu=10^6/2^{20}=95.37\%$. The likelihood that a trial decryption with a test key on an encrypted TAN-list shows only valid TANs, therefore, is:

$$Pl = Pu^{100} = 0.871\%$$

This means that of the $10^{12}$ possible test keys the attacker is able to rule out 99.13% of all candidate test keys, leaving him with 8.7 million possible keys. If the predefined number of verification trials of the retry counter of the credential issuer for false TAN entries is e.g. 5, then the attacker has chance of 5 out of 8.7 million to hit the right key. This chance corresponds to the security level of the system 100. The security level could be increased by reducing the predefined number of verification trials, by increasing the key-lengths of the weak key or by reducing the (maximum) level of deviation from a uniform distribution of the binary representation of the TAN-list. By changing these three parameters, the credential issuer 130 can adapt and predefine the security level of the respective application.

According to an embodiment of the invention, the security level is chosen in such a way that the chance of a brute force attacker to hit the right shared key is less than 1%.

According to an embodiment of the invention, the security level is chosen in such a way that the chance of a brute force attacker to hit the right shared key is less than 0.01%.

According to an embodiment of the invention, the security level is chosen in such a way that the chance of a brute force attacker to hit the right shared key is less than 0.00001%.

If one of these security levels or another security level has been set, the other parameters, i.e. the key-lengths of the shared key, the number of verification trials and the maximum level of deviation from a uniform distribution can be chosen accordingly by means of the above described methods.

According to yet another embodiment of the invention, a group of two individual credentials, i.e. in this example two individual TANs consisting of 12 decimal numbers, are transformed into a binary representation of 40 bits. These 50 groups establish the units for binary conversion. Hence the binary representation of the TAN-list is generated by applying the following encoding or conversion scheme:

Encode units of two TANs (10^12) into 40 bits of binary data.

In other words, each of the values 0-999999999999 of the twelve decimal digits is encoded by means of a binary representation (a binary number) of 40 bits. In general a binary encoding scheme with 40 bits allows for encoding of 2^40=1099511627776 values. Thus there are again some binary numbers that do not represent encoded TANs. This introduces some redundancy or structure in the binary representation of the TAN-list.

The security level of this exemplary embodiment of the invention can be determined as follows. Decrypting the encrypted TAN-list equals to rolling 50 dice with values from 0-(2^40-1). If all dice show only values from 0-999999999999, the test key could be the real weak shared key. The chance that a single die shows a valid TAN value between 0 and 999999999999 is: $Pu=10^{12}/2^{40}=90.95\%$ The likelihood that a trial decryption with a test key on an encrypted TAN-list shows only valid TANs, is therefore again:

$$Pl=Pu^{50}=0.871\%$$

This means that of the 10^12 possible test keys the attacker is able to rule out 99.13% of all candidate test keys, leaving him with 8.7 million possible keys. If the predefined number of verification trials of the retry counter of the credential issuer for false TAN entries is e.g. 5, then the attacker has chance of 5 out of 8.7 million to hit the right key. This chance corresponds to the security level of the credential system.

According to yet another embodiment of the invention, an encoding scheme that provides additional message space for the message M is provided. According to this embodiment of the invention, the credential alphabet A is enlarged by a number of additional noise symbols. Noise symbols are symbols that are not valid credential symbols. The enlarged alphabet is denoted as noise alphabet Ax. The noise alphabet Ax comprises the credential symbols of the credential alphabet A and, in addition, a number of noise symbols. The number of additional noise symbols is preferably chosen in such a way that the total number of symbols in the noise alphabet is a power of two.

In other words, an extended noise alphabet Ax is created, wherein $$Ax=\{a1, \ldots, ak, ak+1, \ldots, akx\}, \text{ wherein}$$
$$k<(kx==2^x)<2*k$$

ak+1, . . . akx are the noise symbols and a1, . . . ak are the credential symbols.

As an example, in a TAN-list only decimal numerals are considered as valid credential symbols. These decimal numerals are extended by the noise symbols A, B, C, D, E and F. The resulting noise alphabet comprises the credential symbols 0, 1, 2, 3, 4, 5, 6, 7, 8 and 9 and the noise symbols A, B, C, D, E and F. The noise alphabet has a size of 2^4=16 symbols. Providing a noise alphabet with a size equal to a power of two has the advantage that the binary representation of the set of credentials comprises a uniform distribution of zeros and ones.

Figure 14:
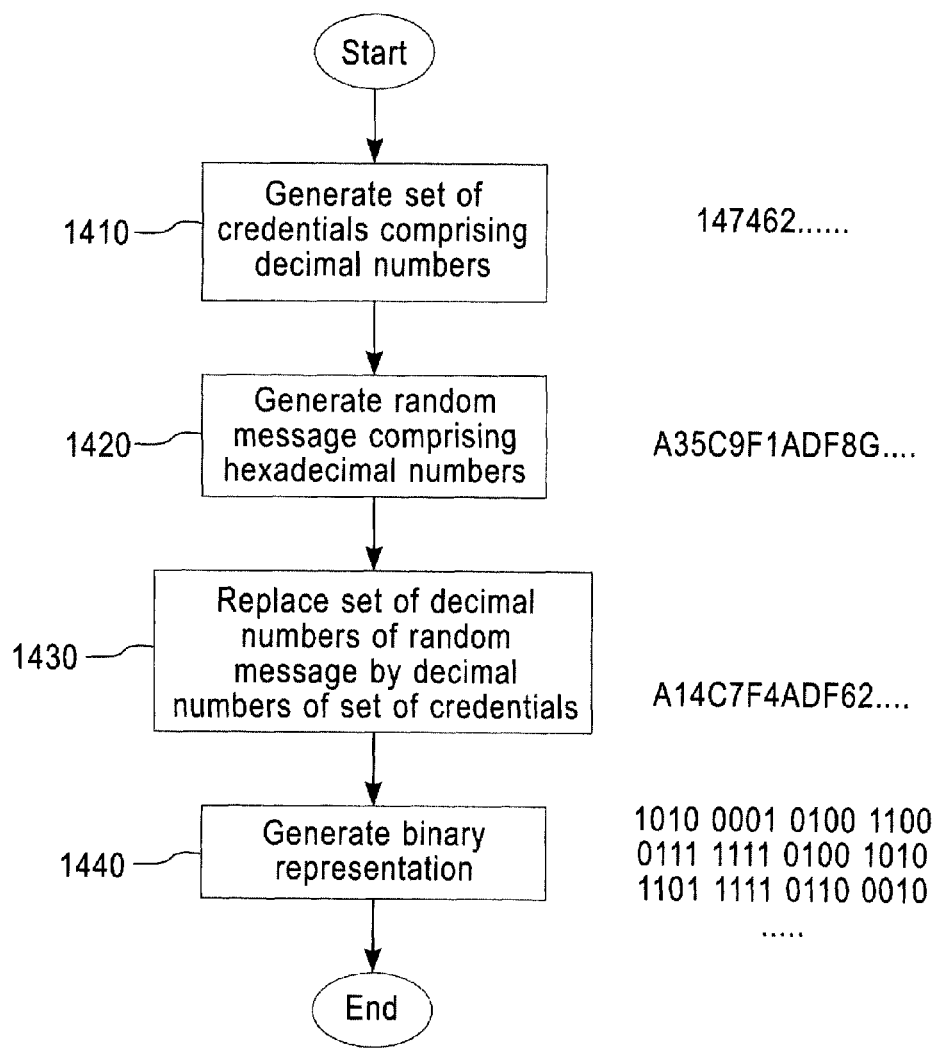
FIG. 14 is still another flow chart associated with the server computer system.

FIG. 14 illustrates a method for generating a binary representation of a set of credentials that comprises noise symbols.

In step 1410, the set of credentials is generated comprising a predefined number of credential symbols. In this example, it is again assumed that the set of credentials is a TAN-list that comprises 600 decimal numbers as credential symbols. These 600 decimal numbers represent 100 TANs. The step 1410 may be performed by a random generator of the credential issuer 130. An example output of step 1410 may look as follows 147462 . . . , wherein only the first TAN 147462 of the TAN list is shown and the further 99 TANs are illustrated by the dots.

In step 1420, a random message is generated consisting of a number of dummy credential symbols and noise symbols derived from the noise alphabet. The number of dummy credential symbols is greater or equal to the predefined number of credential symbols. In this example the predefined number of credential symbols is the size of the TAN-list, i.e. 600. The dummy credential symbols are decimal numbers of the credential alphabet 0, 1, 2, 3, 4, 5, 6, 7, 8 and 9. The noise symbols are established by the symbols A, B, C, D, E and F. The random message may be generated by a random hexadecimal number generator. The random message consists in this example of 960 hexadecimal digits.

An example output of step 1420 may look as follows A35C9F1ADF86 . . . , wherein only the first 12 symbols of the random message are shown and the further 948 symbols are illustrated by the dots. The first 12 symbols of the random message comprise 6 dummy credential symbols (3, 5, 9, 1, 8, 6) and 6 noise symbols (A, C, F, A, D, F).

In step 1430, a predefined set of the dummy credential symbols of the random message is replaced by the credential symbols. The predefined set of the dummy credential symbols can e.g. be defined as the first 600 dummy credential symbols in the random message.

In this example, the 6 dummy credential symbols 3, 5, 9, 1, 8, 6 are replaced by the credential symbols 1, 4, 7, 4, 6, 2 of the set of credentials.

This results in the following message:
A14C7F4ADF62 . . . , wherein again only the first 12 symbols of message are shown and the further 948 symbols are illustrated by the dots.

In step 1440 a binary representation of this message is generated by means of the hexadecimal encoding scheme. This establishes a binary representation of the set of credentials with a predefined maximum level of deviation from a uniform distribution. The binary representation looks as follows:

1010 0001 0100 1100 0111 1111 0100 1010 1101 1111 0110 0010 wherein again only the first 12 symbols of message are shown and the further 948 symbols are illustrated by the dots.

The size overhead of this example compared to a full binary conversion of the TAN-list can be calculated as follows:

600 decimal numbers (10^600) can be encoded in 1994 bits.

The above described scheme uses 960 hexadecimal digits, each being encoded with 4 bits. This results in 3940 bits which is 193% of the full binary conversion.

The security level of this exemplary embodiment of the invention can be determined as follows. An attacker can only rule out test keys that result in decrypted messages with less than 600 credential symbols, i.e. less than 600 hexadecimal digits with one of the values 0, 1, 2, 3, 4, 5, 6, 7, 8 and 9. The likelihood in this example is about 50%. This can be calculated as follows:

The message comprises 960 hexadecimal digits. Each of the 10 credential symbols (0, 1, 2, 3, 4, 5, 6, 7, 8 and 9) is supposed to arise with the same probability of 1/16. Hence the average number of credential symbols within the 960 hexadecimal digits is 10/16*960=600. In other words, the probability that a random message comprises less than 600 credential symbols is app. 50%. This probability is reached on the expense of +93% additional message size.

Any disclosed embodiment may be combined with one or several of the other embodiments shown and/or described. This is also possible for one or more features of the embodiments.

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Computer program means or computer program in the present context mean any expression, in any language, code or notation, of a set of instructions intended to cause a system having an information processing capability to perform a particular function either directly or after either or both of the following: a) conversion to another language, code or notation; b) reproduction in a different material form.

The invention claimed is:

1. A method for distribution of a set of credentials from a credential issuer to a credential user, wherein the credential user is provided with a user device, wherein a first channel and a second channel are provided for communication between the user device and the credential issuer, the method comprising the steps of:

distributing a shared key between the user device and the credential issuer by means of the second channel;

generating a binary representation of the set of credentials with a predefined maximum level of deviation from a uniform distribution by: (i) generating a first representation of the set of credentials with a first level of randomness, wherein the first level of randomness corresponds to a first level of deviation from a uniform distribution; (ii) transforming the first representation into a second representation of the set of credentials with a second level of randomness, wherein the second level of randomness is higher than the first level of randomness and corresponds to a second level of deviation from a uniform distribution, and wherein the second level of deviation from a uniform distribution is lower than the first level of deviation from a uniform distribution; and (iii) transforming the second representation of the set of credentials into the binary representation with the predefined maximum level of deviation from a uniform distribution;

encrypting the binary representation of the set of credentials by means of the shared key;

distributing the encrypted set of credentials via the first channel from the credential issuer to the user device; and decrypting the encrypted set of credentials by the user device by means of the shared key, wherein the predefined maximum level of deviation from a uniform distribution of the binary representation of the set of credentials is determined by a predefined security level, key-lengths of the shared key and the predefined number of verification trials;

wherein a message M being a sequence of credential symbols over the credential alphabet A:

A={a1, . . . , ak} credential alphabet with k credential symbols, k>=1 w=s1|s2| . . . |sj word constructed by concatenating j credential symbols s, s element A, j>=1; each word represents a credential;

W=(w1, . . . , wq) set of q words, q>=1, establishing a set of credentials; and

M=w1| . . . |wq message consisting of n credential symbols s, s element A, n =sum(q=1,q)j(wq).

2. The method according to claim 1, further comprising the step of providing the decrypted credential from the credential user to the credential issuer for verification, wherein the credential issuer provides a predefined number of verification trials.

3. The method according to claim 1, wherein the shared key is a weak key.

4. The method according to claim 1, wherein the second channel comprises a manual user interface.

5. The method according to claim 1, further comprising the steps of:

generating and displaying the shared key by the user device; manually entering the shared key by the credential user on a further device; and transferring the shared key from the further device to the credential issuer.

6. The method according to claim 1, further comprising the steps of: generating the shared key by the credential issuer; transferring the shared key from the credential issuer to a further device; displaying the shared key by the further device; and manually entering the shared key by the credential user on the user device.

7. The method according to claim 1, wherein the credentials comprise a predefined number of credential symbols, wherein the credential symbols are elements of a credential alphabet.

8. The method according to claim 7, wherein the size of the credential alphabet is a power of two.

9. The method according to claim 1, further comprising the step of adding noise symbols to the set of credentials.

10. The method according to claim 9, wherein the noise symbols are derived from a noise alphabet consisting of credential symbols and one or more noise symbols, wherein the size of the noise alphabet is a power of two.

11. The method according to claim 10, further comprising the steps of generating the set of credentials comprising a predefined number of credential symbols;

generating a random message consisting of dummy credential symbols and noise symbols derived from the noise alphabet, wherein the number of dummy credential symbols is greater than or equal to the predefined number of credential symbols of the set of credentials;

replacing in the random message a predefined set of the dummy credential symbols by the credential symbols of the set of credentials; and generating a binary representation of the random message, wherein the binary representation of the random message is a binary representation of the set of credentials with the predefined maximum level of deviation from a uniform distribution.

12. The method according to claim 1, wherein the set of credentials is divided into units for binary conversion, wherein the units for binary conversion are chosen so that the proportion of binary representations that do not represent credential symbols is smaller than a predefined proportion.

13. The method according to claim 1, wherein the set of credentials is divided into units for binary conversion, wherein each unit comprises two or more credential symbols.

14. The method according to claim 1, wherein the first channel is an untrusted channel and the second channel is a trusted channel.

15. The method according to claim 1, wherein the credentials are one time authentication codes.

16. The method according to claim 1, wherein the first channel is a wireless communication channel and the second channel comprises at least one of a secure internet connection, a phone line and a mail service.

17. The method according to claim 1, wherein the user device comprises at least one of a mobile phone and a personal digital assistant.

18. A method for distribution of a set of credentials from a credential issuer to a credential user, wherein the credential user is provided with a user device, wherein a first channel and a second channel are provided for communication between the user device and the credential issuer, wherein the method comprises, in a credential server, the steps of:

generating a shared key and distributing the shared key to the user device or receiving a shared key from the user device via the second channel;

generating a binary representation of the set of credentials with a predefined maximum level of deviation from a uniform distribution by: (i) generating a first representation of the set of credentials with a first level of randomness, wherein the first level of randomness corresponds to a first level of deviation from a uniform distribution;

(ii) transforming the first representation into a second representation of the set of credentials with a second level of randomness, wherein the second level of randomness is higher than the first level of randomness and corresponds to a second level of deviation from a uniform distribution, and wherein the second level of deviation from a uniform distribution is lower than the first level of deviation from a uniform distribution;

(iii) transforming the second representation of the set of credentials into the binary representation with the predefined maximum level of deviation from a uniform distribution;
encrypting the binary representation of the set of credentials by means of the shared key; and
distributing the encrypted set of credentials via the first channel to the user device,
wherein the predefined maximum level of deviation from a uniform distribution of the binary representation of the set of credentials is determined by a predefined security level, key-lengths of the shared key and the predefined number of verification trials;
wherein a message M being a sequence of credential symbols over the credential alphabet A:
A={a1, . . . , ak} credential alphabet with k credential symbols, k>=1
w=s1|s2| . . . |sj word constructed by concatenating j credential symbols s, s element A, j >=1; each word represents a credential;
W=(w1, . . . , wq) set of q words, q>=1, establishing a set of credentials; and
M=w1| . . . |wq message consisting of n credential symbols s, s element A, n=sum(q=1,q)j(wq).

19. A method for receiving a set of credentials from a credential server by a user device, wherein a first channel and a second channel are provided for communication between the user device and the credential server, wherein the method comprises, in the user device, the steps of:
distributing a shared key between the user device and the credential issuer by means of the second channel;
receiving a binary representation of the set of credentials with a predefined maximum level of deviation from a uniform distribution, wherein the binary representation of the set of credentials is generated by: (i) generating a first representation of the set of credentials with a first level of randomness, wherein the first level of randomness corresponds to a first level of deviation from a uniform distribution; (ii) transforming the first representation into a second representation of the set of credentials with a second level of randomness, wherein the second level of randomness is higher than the first level of randomness and corresponds to a second level of deviation from a uniform distribution, and wherein the second level of deviation from a uniform distribution is lower than the first level of deviation from a uniform distribution; and (iii) transforming the second representation of the set of credentials into the binary representation with the predefined maximum level of deviation from a uniform distribution, wherein the predefined maximum level of deviation from a uniform distribution of the binary representation of the set of credentials is determined by a predefined security level, key-lengths of the shared key and the predefined number of verification trials, and wherein the binary representation of the set of credentials is encrypted by means of the shared key;
decrypting the encrypted set of credentials by means of the shared key; and storing the decrypted set of credentials;
wherein a message M being a sequence of credential symbols over the credential alphabet A:
A={a1, . . . , ak} credential alphabet with k credential symbols, k>=1
w=s1|s2| . . . |sj word constructed by concatenating j credential symbols s, s element A, j >=1; each word represents a credential;
W=(w1, . . . , wq) set of q words, q>=1, establishing a set of credentials; and
M=w1| . . . |wq message consisting of n credential symbols s, s element A, n=sum(q=1,q)j(wq).

20. A method according to claim 19, wherein distributing a shared key comprises the step of generating the shared key and distributing the shared key to the credential server.

21. A method according to claim 19, wherein distributing a shared key comprises receiving the shared key from the credential server via the second channel.

22. A system for distribution of a set of credentials from a credential issuer to a credential user, wherein the credential user is provided with a user device, wherein a first channel and a second channel are provided for communication between the user device and the credential issuer, the system comprising:
a key shared between the user device and the credential issuer by means of the second channel;
a binary representation of the set of credentials with a predefined maximum level of deviation from a uniform distribution, wherein the binary representation of the set of credentials is generated by (i) generating a first representation of the set of credentials with a first level of randomness, wherein the first level of randomness corresponds to a first level of deviation from a uniform distribution; (ii) transforming the first representation into a second representation of the set of credentials with a second level of randomness, wherein the second level of randomness is higher than the first level of randomness and corresponds to a second level of deviation from a uniform distribution, and wherein the second level of deviation from a uniform distribution is lower than the first level of deviation from a uniform distribution; and (iii) transforming the second representation of the set of credentials into the binary representation with the predefined maximum level of deviation from a uniform distribution, and wherein the predefined maximum level of deviation from a uniform distribution of the binary representation of the set of credentials is determined by a predefined security level, key-lengths of the shared key and the predefined number of verification trials;
an encrypted set of credentials comprised of the binary representation of the set of credentials encrypted by means of the shared key, wherein the encrypted set of credentials is distributed via the first channel from the credential issuer to the user device; and
a decrypted set of credentials comprised of the encrypted set of credentials decrypted by the user device by means of the shared key;
wherein a message M being a sequence of credential symbols over the credential alphabet A:
A={a1, . . . , ak} credential alphabet with k credential symbols, k>=1
w=s1|s2| . . . |sj word constructed by concatenating j credential symbols s, s element A, j>=1; each word represents a credential;
W=(w1, . . . , wq) set of q words, q>=1, establishing a set of credentials; and
M=w1| . . . |wq message consisting of n credential symbols s, s element A, n=sum(q=1,q)j(wq).

* * * * *